Jan. 2, 1968  C. R. GERBER ET AL  3,361,966
SPECTRUM-ANALYZER USING A VIBRATING-REED ASSEMBLY
Filed Oct. 27, 1964
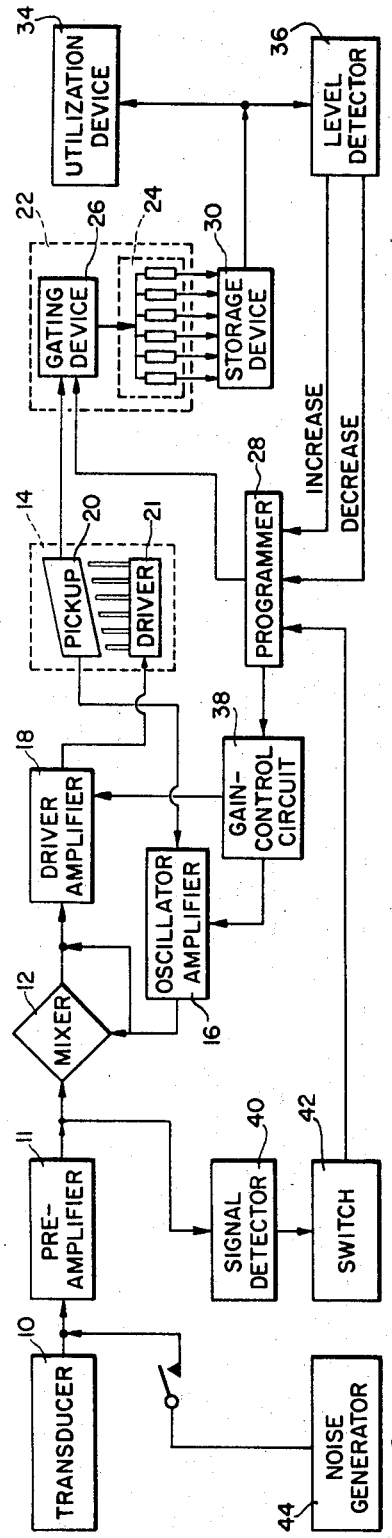
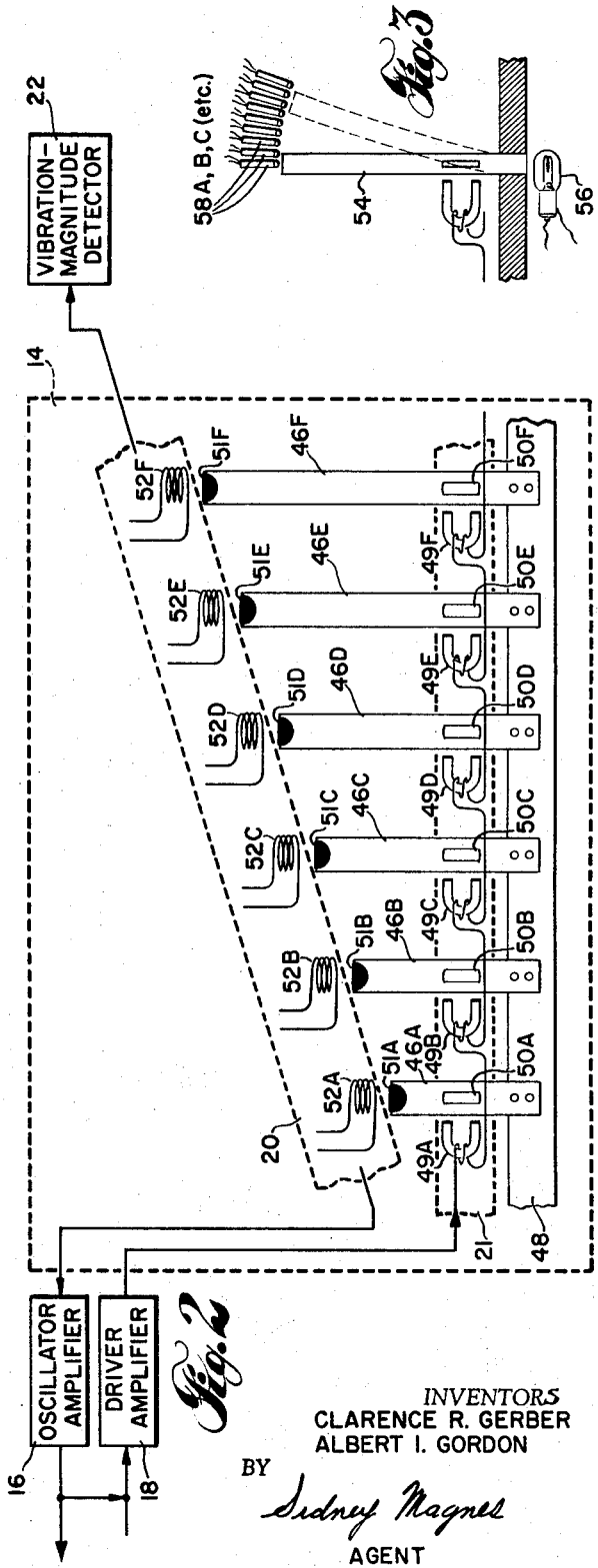
INVENTORS
CLARENCE R. GERBER
ALBERT I. GORDON
BY Sidney Magnes
AGENT

United States Patent Office 3,361,966
Patented Jan. 2, 1968

3,361,966
SPECTRUM-ANALYZER USING A VIBRATING-REED ASSEMBLY
Clarence R. Gerber, Santa Ana, and Albert I. Gordon, Fullerton, Calif., assignors to North American Rockwell Corporation, a corporation of Delaware
Filed Oct. 27, 1964, Ser. No. 406,853
5 Claims. (Cl. 324—77)

This invention relates to a signal analyzer; and more particularly to apparatus for measuring the various frequencies, and the amplitudes thereof, that comprise a given signal.

It is well recognized that many signals, such as noises, have their own individual "signatures"; that is, the noises produced by an earthquake, by various explosions, by different types of machinery, etc., each have their own characteristic arrangement of frequencies and relative amplitudes thereof—these forming the "signature" of that noise. It is therefore possible, by measuring the various component-frequencies and their relative amplitudes—i.e., by analyzing the spectrum—to determine the origin of the noise.

It is also known, that the component-frequencies of these noises are often as low as 0.1 cycle per second (c.p.s.) Reliably measuring such low frequencies has always been a problem; and, in the past, no satisfactory apparatus for measuring such a low frequency has been available. Most prior-art attempts to measure these very low frequencies have avoided electronic circuitry, which tends to be very bulky for such low-frequency measurements, and have involved the use of vibrating-reeds and tuning-forks. Since vibrating-reeds and tuning-forks operate on the same basic principle of mechanical resonance, the following discussion will be presented in terms of the vibrating-reed; and the similarity between the vibrating-reed and the tuning-fork will be pointed out later.

Vibrating-reed-assemblies are well known, and are described in various publications, such as U.S. Patents 1,416,550 and 2,649,848. Broadly speaking, these assemblies comprise a series of vibratable reeds having one end of each reed attached to a common reed-bar; the unattached ends of the reeds being free to vibrate. Each reed has a natural vibrational-frequency, which becomes lower as the length and mass of the reed is increased, and as the reed's attachment to the common reed bar becomes more rigid. Each reed of the vibrating-reed-assembly is adjusted to have a vibrational-frequency different from the other reeds; and when the common reed-bar is mechanically vibrated, the particular reed having a vibrational-frequency corresponding to the vibrational rate of the reed-bar vibrates at a greater amplitude than any other reed. Therefore, one reed will be vibrating vigorously, whereas the others will be substantially at rest. If the common reed-bar should now be vibrated at a different frequency, a different reed of the reed-assembly will vibrate. In this way, the reed showing the greatest amplitude of vibration indicates the input vibrational-frequency; and thus, a suitable reed-assembly can be used to sense the frequencies present in an incoming signal.

In order to produce a reed that will vibrate at a low frequency of about 0.1 c.p.s., the reed will ordinarily be about 2 ft. long. Not only is a reed of this length unwieldly; but it is also rather inaccurate, since extremely small differences in length and/or mass will cause the reed to have a vibration frequency that is appreciably different from the desired vibrational-frequency. Moreover, a reed-assembly comprising a plurality of such large reeds would be bulky and heavy. For these reasons, and others, prior-art vibration-reed-assemblies have not been satisfactory for detecting low frequencies.

Objects and drawings

It is therefore, a principal object of the present invention to provide an improved spectrum-analyzer.

It is another object of the present invention to provide a small, compact, lightweight vibrating-element spectrum-analyzer that is capable of measuring low frequencies.

It is a further object of the invention to provide a multiple-frequency-sensitive assembly that provides extremely good accuracy and temperature stability.

It is a still-further object of the invention to provide electronic circuitry and a multiple-frequency-sensitive assembly that is extremely precise, accurate, and stable.

The attainment of these objects and others will be realized from the following specification, taken in conjunction with the drawings of which:

FIG. 1 shows an embodiment of the invention;
FIG. 2 shows a reed-assembly; and
FIG. 3 shows a different type of reed and pickup arrangement.

Summary

Briefly stated, the present inventive concept provides a spectrum-analyzer that is capable of detecting low frequencies; the spectrum-analyzer comprising a mechanical-resonance arrangement, such as a vibrating-element-assembly having short reeds that are inherently sensitive to relatively high frequencies. In order to make the spectrum-analyzer sensitive to low frequencies, incoming low frequencies are converted to low-frequency electrical signals, and these are "heterodyned" with a reference signal; the result of the heterodyning operation being the production of higher frequencies, to which the short vibrating reeds are sensitive.

Rather than using an all-electronic oscillator to produce the reference signal used in the heterodyning operation, the present invention contemplates a reed-assembly comprising an "oscillator" reed for producing the reference signal. By making the oscillator-reed a portion of the reed-asssembly, a temperature-stable spectrum-analyzer is obtained.

The present inventive concept also contemplates converting the output into a digital signal, so that it may be transmitted in an optimal manner.

Detailed description

An embodiment of the invention is shown in FIG. 1. Here an input transducer 10—such as a microphone, a hydrophone, the read-head of a magnetic or electrostatic recording system, the electro-magnetic pickup of a disc recording system, or the like—converts noise, or an equivalent signal, into electrical signals of corresponding frequency; these electrical signals being applied through a pre-amplifier 11 to an electronic mixer 12, the pre-amplifier providing the additional advantage that it may provide an impedance-match between the transducer and the mixer.

Electronic mixers such as 12 are well known, one type being used in radio receivers to produce the IF signals. Their operation is such that when two input signals are applied to the mixer, the output of the mixer comprises two different signals, whose frequencies are the sum and the difference of the frequencies of the input signals. This signal-mixing operation is known as "heterodyning"; and, generally speaking, an input signal is mixed, or heterodyned, with a "reference" signal; the latter of which is either a variable or a fixed frequency, depending upon the usage.

A brief explanation of the heterodyning operation will be helpful. Assume that the input signal from transducer 10 has a frequency of 0.1 c.p.s., and that the reference signal (the production of which will be explained later) has a frequency of 1000 c.p.s. The outputs of the mixer will therefore be the sum and the difference of the two signals applied to the mixer; i.e., 1000+0.1=1000.1 c.p.s. and 1000−0.1=999.9 c.p.s. If now, the input signal from the transducer changes to another frequency, such as 256 c.p.s., the outputs of the mixer would now be 1000+256= 1256 c.p.s. and 1000−256=744 c.p.s.

As indicated in FIG. 1, the output signal from mixer 12 is applied to reed-assembly 14, which has a plurality of reeds, individual ones of which are sensitive to pre-selected frequencies within a suitable range, for example 999.9 to 744 c.p.s. By using this range, the reeds may be made quite small, ranging from about 1 inch to 2 inches in length; moreover, the reed-assembly inherently will be insensitive to the 1000.1 to 1256 c.p.s. frequency-sum signals from mixer 12.

In operation, each incoming signal is heterodyned with the reference signal, to be more particularly described below, the resultant mixer signals causing only particular reeds of reed-assembly 14 to vibrate; the other reeds remaining relatively immobile. Specifically a 0.1 c.p.s. input signal, when heterodyned with a 1000 c.p.s. reference signal, would cause the "999.9" reed to vibrate, although this reed would now be identified as the "0.1" reed. Similarly, a 256 c.p.s. input signal, when heterodyned with a 1000 c.p.s. reference signal, would cause the "744" reed to vibrate, although this reed would now be identified as the "256" reed. In a like manner, other-frequency input signals will cause other reeds to vibrate. Thus, a composite-frequency incoming signal will cause vibration of the specific reeds corresponding to the component frequencies, the vibrating reeds therefore indicating the component-frequencies contained in the incoming signal.

Under some condtiions it may not be desired to detect the presence of every component-frequency of the incoming signal, whereupon a smaller number of reeds may be used. The reeds may be chosen to cover a smaller spectrum; to cover a large spectrum in pre-determined steps; or to be sensitive to only the frequencies known to form a particular signature.

As previously indicated, reed-assembly 14 includes an oscillator-reed that is of suitable length so that its natural vibration frequency is such as to produce a signal of a convenient frequency, such as 1000 c.p.s. This 1000 c.p.s. frequency is used in two ways.

The first use of the 1000 c.p.s. signal is as a reference signal, for which use the signal is transmitted from the pickup 20 of reed-assembly 14—preferably through a variable-gain oscillator-amplifier 16—to mixer 12, where it acts as the reference signal that is heterodyned against the input signal produced by the transducer.

The second use of the 1000 c.p.s. signal is to vibrate the oscillator-reed, so that this reed continues to provide a 1000 c.p.s. signal. To achieve this result, the 1000 c.p.s. signal from pickup 20 can be arranged to either pass through or by-pass mixer 12—the latter arrangement being shown in FIG. 1—so that the 1000 c.p.s. signal is applied, preferably through a variable-gain driver-amplifier 18, to the driver 21 of reed-assembly 14. Here the 1000 c.p.s. signal causes the 1000 c.p.s. oscillator-reed to continue its vibration, and to thus continue the generation of the 1000 c.p.s. signal.

Pickup 20 may take several forms, two of which will be explained in detail later. Suffice it to say at this time, that pickup 20 comprises a sensing-arrangement wherein individual sensors are associated with each reed in order to sense and produce output signals corresponding to the vibrational amplitude of each reed. These sensor output signals are applied in parallel to a gating device or multiplexor 26 that sequentially applies the various sensor-output-signals to an arrangement 24 that may be called a "quantizer" or an "encoder." Gating device 26 acts like a rotary switch under the influence of a programmer 28, and provides quantizer 24 with sequential samples of the various sensor output-signals. A suitable programmer-gating arrangement is shown in U.S. Patent 2,964,657. In this "sampling" technique, it is preferable that the signal from each sensing-arrangement of pickup 20 be sampled for a time-interval of at least two cycles of the lowest frequency. In this way, each reed is periodically checked, to find the amplitude—if any—of its vibration.

It was previously pointed out that an incoming signal would comprise a plurality of component-frequencies of different amplitudes, and would cause some reeds to vibrate more vigorously than others. It is therefore desirable to sense, not only which reeds are vibrating, but to also detect their magnitude of vibration. This is accomplished by measuring the amplitude of the signals from pickup 20.

In order to achieve this result, the embodiment of FIG. 1 illustrates an encoder 24 that comprises a plurality of circuits known as Schmitt triggers, each being preset to become conductive at a different level of sensor output signal. For example, a low-level signal will conductivate one Schmitt trigger; an intermediate-level signal will conductivate additional Schmitt triggers; and a maximal level signal will conductivate all of the Schmitt triggers. The outputs of the Schmitt triggers are applied to a storage device 30; the number of Schmitt trigger signals and/ or an indication of which Schmitt triggers were conductivated indicating the level of the sensor signal associated with each reed.

Alternatively, a quantizer circuit may be used to indicate the level of the sensor output signal. In either case, the result is a series of signals that indicate the vibrational amplitudes of the various reeds; these vibrational amplitudes corresponding to the frequencies, and amplitudes thereof, that comprise the incoming signal.

Since—in the illustrated embodiment—the outputs of the various reeds are being sampled sequentially, it may be desirable to store the information in a storage device 30, which may be of any suitable type. For example, the sampling rate may be such that the signals are not suitable for immediate usage, whereupon the storage device may store the signals for a desired interval of time; after which they may be used. Under other conditions, it may be desirable to arrange the signals into a "block" of information, along with suitable identifying and synchronizing signals, and the storage device permits this to be done. The output of storage device 30 is applied to a utilization device 34 that is capable of either transmitting the information, displaying it, recording it for subsequent identification, etc. Alternatively the information may be directly recorded for later use or analysis.

There are times when the incoming signals represent either a weak or a distant noise; and therefore the output signals from storage device 30 may have a high or low magnitude, depending upon the above factors. In order to optimize the operation of the equipment, a level detector 36—such as a suitably-biased flip-flop circuit—detects the level of the output signals from the storage device 30—or alternatively from the vibration-magnitude detector 22, or from the pickup 20—and applies an "increase" or "decrease" signal to programmer 28, which thereupon activates a gain-control circuit 38 that controls the gain of oscillator-amplifier 16 and driver-amplifier 18. As previously indicated, these amplifiers control the signals applied to reed-assembly 14, so that this arrangement assures that the reed-assembly receives suitable-magnitude signals at all times; the level detector 36, or the programmer 28, indicating whether the incoming signal is strong or weak.

There are times when the disclosed device will be positioned in a remote and unattended location, with a limited source of power; and it is desirable that the power be used as efficiently as possible. In order to achieve this result, a signal-detector 40 monitors the output of pre-amplifier 11; and, when a signal is received, signal-detector 40 operates a switch 42, such as a Schmitt trigger, that turns on programmer 28. In this way, the equipment is ordinarily off until a signal is received, whereupon the signal-detector 40 activates the device. Thus, the power source is used most efficiently.

In order to calibrate the equipment, signals from a noise-generator 44 may be used as simulated incoming signals; and, since this generator provides signals of practically all frequencies in the range of interest, the equipment may be calibrated and/or adjusted.

It was previously pointed out that the reed-assembly has a plurality of reeds that have their own mutually distinct vibrational-frequencies, and FIG. 2 illustrates one such reed-assembly. Here reeds 46A, 46B, 46C, etc., illustrated as having different lengths, and are fastened to a common reed-bar 48; in this illustrated arrangement, the common reed-bar being fixedly-positioned, rather than being vibratory as previously discussed. Driver 21 comprises a plurality of coils—shown as connected in series, but which alternatively can be connected in parallel— that receive signals from driver amplifier 18; these signals activating electromagnets 49A, 49B, 49C, etc., that attract ferromagnetic slugs 50A, 50B, 50C, etc., and are thus able to cause the reeds to vibrate as described above. Thus, each component frequency is applied to each electromagnet; and when the natural vibrational-frequency of a particular reed is the same as a component-frequency of the signal from driver amplifier 18, that particular reed vibrates with a greater amplitude than other reeds.

There are a number of ways of picking up a signal from the vibrating reed, one of these sensing-arrangements being shown in FIG. 2. Here, lightweight magnetic pellets, 51A, 51B, 51C, etc., or equivalent structure, are embedded in the end of each reed. As particular reeds vibrate, the movement of their magnetic pellets induce a voltage in specific coils 52A, 52B, 52C, etc. of pickup 20; the voltage induced in the coils being the output signal from pickup 20, these output signals being applied to vibration-magnitude detector 22.

As previously indicated, one of the reeds is an oscillator-reed that is tuned to have a particular vibrational-frequency, and the signal from this oscillator-reed is continuously picked up by the coil associated with the oscillator-reed, and is applied to oscillator amplifier 16. As a result, driver amplifier 18 continuously applies a signal of this frequency to the oscillator-reed, which is therefore continuously vibrating and producing a reference signal.

The reed-assembly of FIG. 2, comprising an oscillator-reed, has two important advantages, as follows. Firstly, it obviates the need for an electronic oscillator and its associated stabilizing circuitry, and secondly, it tends to be temperature-compensated.

Improved operation may be obtained by mounting the reeds on a block of heat-conducting material, as this structure would further assure that all of the reeds are exposed to the same temperature, which would improve the temperature-compensation as discussed above. In addition, it would be preferable that the reed-mounting block be electrically non-conductive, and have a slight resilience, in order to obviate "crosstalk," or electrical and mechanical interaction between the reeds.

Another sensing-arrangement for picking up a signal comprises an optical-fibre arrangement shown in FIG. 3. Here the reed 54 comprises an optical-fibre; a lamp 56 directing light through the reed. As the reed vibrates— by means such as an electromagnet and a ferromagnetic slug previously described—the emergent light impinges upon suitably positioned photoelectric cells 58A, 58B, 58C, etc., the output of the photoelectric cells being the signals produced by pickup 20 of FIG. 1.

It is well known that a tuning-fork is a roughly Y-shaped structure, wherein the tines of the fork vibrate at a frequency determined by their length, mass, rigidity, etc., in much the same manner as a vibrating-reed. The tuning-fork may be driven by suitable driving coils encircling one or both tines; and the pickup coils may encircle one or both tines, or suitable protuberances of the tines. More-complete descriptions of tuning-forks and their uses may be found in various publications, such as U.S. Patent 2,971,323 and Scientific American, April 1964, pages 136–142; and these tuning-forks may be used in place of the previously-described vibrating-reeds.

It will therefore be understood that the term reed-assembly is to be construed as including reed, tuning-forks, and equivalent devices.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. The combination comprising:
   a reed-assembly, said reed-assembly including an oscillator reed;
   closed-loop feedback means for sustaining vibrations of said oscillator-reed, and causing said oscillator-reed to produce a reference-signal;
   a heterodyning circuit having a pair of input terminals and an output terminal;
   means for applying a relatively low-frequency input signal to one of said input terminals;
   means for applying said reference signal from said reed-assembly to the other of said input terminals; and
   means for applying the heterodyned signal from said output terminal to said reed-assembly.

2. The combination comprising:
   a reed-assembly having a plurality of reeds sensitive to relatively-high-frequencies, having an oscillator-reed for generating a reference signal, and having a pickup for producing reed-assembly output signals;
   closed loop feedback means, connected between said pickup and said reed-assembly, for causing said oscillator-reed to have a sustained vibration, and to continuously produce said reference signal;
   a heterodyning circuit;
   means, comprising a variable-gain oscillator-amplifier for applying said reference signal from said oscillator-reed to said heterodyning circuit;
   means, comprising said heterodyning circuit, for heterodyning a relatively-low-frequency input signal with said reference signal from said oscillator-reed to produce relatively-high-frequency output signals;
   means, comprising a variable-gain driver amplifier, for applying said relatively-high-frequency output signals and said reference signal to said reed-assembly;
   means for sensing the strength of the reed-assembly output signals; and
   means for adjusting the gain of at least one of amplifiers in accordance with the strength of said reed-assembly output-signals.

3. The combination comprising:
   a reed-assembly having a plurality of vibratable reeds, including an oscillator-reed;
   means for causing the vibration of said reeds to produce output signals; and
   closed look feedback means for applying the output signal from said oscillator-reed to said reed-assembly for producing sustained vibration of said oscillator-reed.

4. A reed-assembly comprising:
   a plurality of reeds vibratable in a flexural manner, each of said reeds containing a pellet of magnetic material capable of producing a magnetic field that varies with the amplitude of reed vibration;
   means for causing said magnetic field variations to produce an output signal; and
   closed loop feedback means for causing an output signal of a selected reed of said plurality of reeds to produce sustained vibration of said selected reed.

5. In a spectrum analyzer, the combination comprising:
- a plurality of flexurally vibratable elements having mutually distinct vibrational-frequencies;
- a pickup assembly for providing electrical signals representing vibrations of individual ones of said elements;
- input means for receiving electrical input signals representing a source of frequencies to be analyzed;
- heterodyning means, having first and second inputs, for receiving said input signals and one of said signals representing vibrations of a given one of said vibratable elements, said heterodyning means comprising closed loop feedback means including said pickup assembly and said one element for effecting sustained vibrations of said one element; and
- means responsive to the heterodyning means for driving said vibratable elements.

References Cited
UNITED STATES PATENTS

| | | | |
|---|---|---|---|
| 2,681,588 | 6/1954 | Dyner | 324—80 XR |
| 2,753,524 | 7/1956 | Newsom | 324—77 |
| 2,967,274 | 1/1961 | Hurvitz | 324—77 |
| 3,078,426 | 2/1963 | Foundas | 324—77 XR |
| 3,213,197 | 10/1965 | Hawkins | 324—77 XR |
| 3,235,799 | 2/1966 | Hurvitz | 324—88 XR |

OTHER REFERENCES

Radio News, "Amateur's Frequency-Deviation Meter," R. P. Turner, December 1944. (Copy available in 324–80).

RUDOLPH V. ROLINEC, *Primary Examiner.*

P. F. WILLE, *Assistant Examiner.*